March 21, 1961 E. COHEN 2,976,487
STABILIZED TIMING CIRCUIT
Filed Aug. 7, 1958 4 Sheets-Sheet 1

INVENTOR
E. COHEN
BY W. L. Keefauver
ATTORNEY

INVENTOR
E. COHEN
BY W. L. Keefauver
ATTORNEY

March 21, 1961
E. COHEN
2,976,487
STABILIZED TIMING CIRCUIT
Filed Aug. 7, 1958
4 Sheets-Sheet 3

INVENTOR
E. COHEN
BY W. L. Keefauver
ATTORNEY

INVENTOR
E. COHEN
BY W. L. Keefauver
ATTORNEY

United States Patent Office 2,976,487

Patented Mar. 21, 1961

2,976,487

STABILIZED TIMING CIRCUIT

Ezra Cohen, Brooklyn, N.Y., assignor to Bell Telephone Laboratories, Incorporated, New York, N.Y., a corporation of New York Filed Aug. 7, 1958, Ser. No. 753,822

16 Claims. (Cl. 324—68)

This invention deals with timing networks and more particularly with timing circuits requiring substantially fixed sources of supply voltage.

A wide variety of circuits is employed for the measurement of time intervals in communication systems and in electronic control equipment. Generally, such circuits produce voltages that vary with time in a known fashion so that the time interval required to arrive at a preselected voltage may be predicted. For example, timing circuits frequently employ the unique delay properties of resistor-capacitor combinations or of resistor-inductor combinations, commonly known as RC circuits and RL circuits, respectively. Parameters affecting the accuracy of timing intervals in circuits of this type usually include supply or biasing voltages and variations therein, the characteristics of the circuit elements employed, and the environmental conditions under which the circuits operate.

Certain new developments in electronic control equipment and in communication systems have created demands for reliability and accuracy in timing circuits to a degree which heretofore has not been required. For example, a communication system commonly identified as a time assignment speech interpolation system, or a TASI system, requires particularly high standards of reliability and accuracy in the performance of timing functions, inasmuch as the proper operation of the entire system is dependent thereon. Such a system is disclosed, for example, in the application of F. A. Saal and I. Welber, Serial No. 686,468, filed September 26, 1957, and now Patent No. 2,935,569. Briefly, a TASI system is designed to increase the capacity of communication channels. When all the channels in a system are assigned, for example the channels provided by a telephone cable, additional subscribers may be accommodated at a given time by assigning to them the channels of parties who are not actually talking at that time. The switching operations required in searching for an unused channel, in assigning a second talker to that channel when the first or originally assigned talker is silent, and in providing a channel to the first talker when his demand for it is renewed are all accomplished automatically. Timing circuits are employed to initiate many of these operations. For example, a timing circuit is used to time the transmission period for a disconnect signal. Obviously, for such a system to function properly all of the timing circuits employed must operate reliably and accurately. Moreover, it is essential that these circuits perform their assigned duties under the most severe environmental conditions. A further requirement for such timing circuits is operation under emergency power conditions when voltage supplies are not regulated. Timing circuits known heretofore are inadequate to meet such requirements.

It is therefore an object of this invention to increase the reliability and accuracy of timing circuits without resort to complex or expensive circuit arrangements.

It is a more specific object of this invention to make the accuracy of the timing operation of a timing circuit independent of variations in supply voltages.

These and other objects of the invention are realized in apparatus which includes a combination of circuit or current carrying elements, comprising an element or elements of a first kind and an element or elements of a second kind, selected to produce an output voltage wave form varying with time in accordance with a known function. The specific form taken by the varying voltage so produced is dependent on the sources employed to provide operating or bias potentials, on the nature of the circuit elements employed, and on the magnitude of those elements. Where the output voltage is $V_P$, where the operating potentials are $E_1$ and $E_2$, respectively, and where the time function is $f(t)$, the output voltage of a timing circuit embodying the principles of the invention follows the relation $$V_P=F_1(E_1,E_2)+F_2(E_1,E_2)\cdot f(t) \qquad (1)$$

The purpose of the circuit, the accurate measurement or establishment of an interval of time, can be achieved only insofar as the variation of the output voltage of the circuit is predictable. Examining again the factors on which the circuit output voltage depends, it is apparent that the nature of the circuit elements employed and the magnitude of these elements are fixed, after selection, thereby determining $f(t)$. But the sources of operating potential, while nominally fixed, are necessarily subject to some degree of random variation; hence, the timing accuracy of the circuit is keyed to variations in the supply potentials. A variety of voltage stabilizing devices, well known in the art, may of course be used to regulate the sources of operating potential and thus stabilize the circuit timing interval, at least to some degree. This approach, however, is evidently only a half measure and, by resort to complexity, increases the probability of failure.

In accordance with one aspect of the invention, ideal timing stabilization is attained, irrespective of operating potential variations, with a degree of reliability and simplicity not heretofore achieved in arrangements designed to perform similar functions. Specifically, an auxiliary network is provided, which may be conveniently termed a balancing network, comprising at least two current carrying elements, which in various embodiments described in detail below herein are shown as resistors interconnected at a common point, and interconnecting the sources of timing circuit operating potential. Between the output point of the timing circuit and the common point of the balancing network a conducting path is provided which includes a device responsive to a preassigned difference between these two points. In accordance with the invention, if the magnitudes of the balancing network resistors are so proportioned that the ratio of the magnitude of one of them to the sum of the magnitudes of both of them is equal to $f(T)$, where T is the interval to be measured and $f(T)$ is the magnitude attained by $f(t)$ at time $t=T$, the preassigned potential difference between the output point of the timing circuit and the common point of the balancing network will always occur at time $t=T$, irrespective of variations in the supply potentials.

In effect, the application of the principles of the invention controls the voltage variations at the common point of the balancing network so that while the timing circuit voltage which results in an output signal may vary, the time at which the output signal occurs remains fixed. Consequently, unlike a conventional voltage stabilizing or regulating system which attempts to control the operating potential source, or the level of its output, a circuit in accordance with the invention accepts wide variations in the supply potentials with no effect on the duration of the selected timing interval.

The invention is not restricted to any particular circuit configuration but instead may take various forms. For example, one form of the invention employs an RC circuit interconnecting a source of operating potential and a reference potential so that starting with the operation of a switch, the capacitor is progressively charged by the source. The point that is common to the resistor and the capacitor is connected through a diode to the common point of the balancing network. The characteristics of the diode are such that during the early part of the charging operation the common point of the RC circuit is isolated from its load; but when, in the course of the charging operation, the potential of the capacitor has reached that of the common point of the balancing network, the diode is biased to conduct in a direction which serves to trigger a threshold device which in turn generates an output signal.

Another form of the invention employs an RL circuit. The well-known delay properties of the RL circuit are employed to produce an exponential timing wave which serves as a basis for measuring time intervals in a manner similar to that employed in the RC circuit described above herein.

Both the RL and RC forms of the invention generate waves of exponential form for the measurement of time; but a circuit generating a wave of linear form serves equally well. For example, still another form of the invention employs the delay properties of a capacitor or an inductor but the characteristic exponential output is modified by an auxiliary circuit so that the form of the wave serving as the basis for the timing operation is linear.

In all forms of the invention the magnitudes of the current carrying elements of the balancing network are uniquely selected so that the voltage at their junction point has the same functional dependence on the operating potential sources as does the voltage output of the basic timing circuit.

In accordance with a second aspect of the invention, it has been possible to achieve a minimum recovery time of the balancing network after a timing cycle without affecting the stability of the timing operation. In one particular embodiment this aspect of the invention is achieved by providing a conducting path from the junction of the two resistors of the balancing network to one of the sources of operating potential by way of an asymmetric impedance device and a first voltage limiting resistor in series relation and a conducting path to the second source of operating potential by way of the same asymmetric impedance device and a second voltage limiting resistor. The voltage rise of the junction between the resistors of the balancing network is held to a level which is determined in part by the characteristics of the asymmertic impedance device used and the values of the voltage limiting resistors. Restricting the magnitude of the potential change occurring at the balancing network junction at the time $t=T$ ensures the attainment of the proper equilibrium potential at this junction point after the inception of and before the termination of the next succeeding timing interval. The timing interval remains unchanged if the magnitudes of the voltage limiting resistors are selected so that the ratio between them is substantially the same as the ratio between the resistors of the balancing network.

One feature of my invention, therefore, is a timing circuit with a characteristic timing interval which is immune to variations in the circuit biasing voltages of the power supply.

An additional feature of my invention is a circuit arrangement which ensures rapid recovery in a timing circuit after the completion of a timing cycle without affecting the immunity of the timing circuit to variations in supply or biasing voltages.

A complete understanding of this invention together with additional objects and features thereof will be gained from a consideration of the following detailed description and accompanying drawings in which.

Figure 1A:
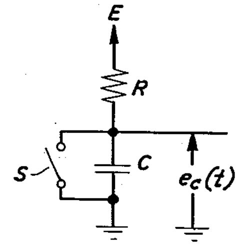
FIG. 1A (PRIOR ART)
Fig. 1A is a schematic circuit diagram showing an RC timing circuit with a single source of operating potential.
Figure 1B:
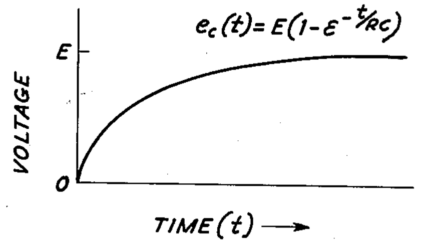
Fig. 1B is a graph showing characteristic output wave form of the circuit of Fig. 1A.
Figure 2A:
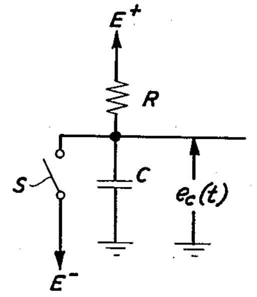
FIG. 2A (PRIOR ART)
Fig. 2A is a schematic circuit diagram showing an RC timing circuit with two sources of operating potential.
Figure 2B:
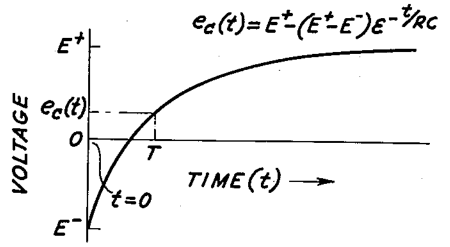
Fig. 2B is a characteristic wave form of the circuit of Fig. 2A.

It is well known that, if a voltage E is applied to a simple RC circuit, as shown in Fig. 1A, and if the switch S, theretofore closed, is opened at time $t=0$, the voltage $e_c(t)$ across the capacitor at any particular time is defined by the curve and the time function expression shown in Fig. 1B. Similarly well known is the action of a simple RC circuit with two applied voltages, for example $E_1$ and $E_2$, or $E^+$ and $E^-$, as shown in Fig. 2A, where as a matter of engineering design, ground is interposed between the two voltages. The voltage rise across the capacitor from $E^-$ toward $E^+$, when the switch S, theretofore closed, is opened at time $t=0$, is defined by the wave form and by the time function expression shown in Fig. 2B. In the case of either circuit, the time at which a particular capacitor voltage is reached is determined by the applied voltages or operating potentials $E^+$ and $E^-$, and a change in either or both operating potentials necessarily results in a change in the duration of the preselected timing interval.

Figure 3:
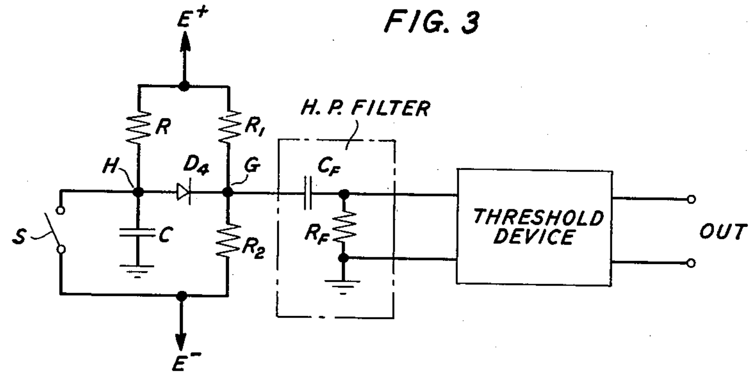
Fig. 3 is a schematic circuit diagram showing an RC circuit, in accordance with the invention, in combination with a balancing network and an output circuit.

Fig. 3 shows an RC circuit comprising a resistor R and a capacitor C having a common junction point H. Two sources of operating potential, $E^+$ and $E^-$ are shown. In accordance with the invention, a balancing network comprising resistors $R_1$ and $R_2$, with a common or junction point G, is bridged between the sources of operating potential. The diode $D_4$ is proportioned to become biased forward for any voltage at point G equal to or greater than the voltage at point H. The filter network comprising capacitor $C_F$ and resistor $R_F$ passes any abrupt change in potential occurring at point G but blocks any relatively slow changes that occur in the operating potentials, $E^+$ and $E^-$. The apparatus shown as a Threshold Device connected across resistor $R_F$ may be any circuit, for example a multivibrator, that produces an output pulse marking the end of a timing interval in response to an abrupt change in the potential of point G.

In the operation of the circuit of Fig. 3, the switch S being initially closed, the capacitor C is initially at potential $E^-$. At time $t=0$ the switch S is opened and capacitor C starts charging toward $E^+$. The equation of the changing voltage at point H is well known to be $$e_H=E^+-(E^+-E^-)\epsilon^{-t/RC} \quad (2)$$

Accordingly, at time $t=T$, Equation 2 becomes $$e_H=E^+-(E^+-E^-)\epsilon^{-T/RC} \quad (3)$$

for which it is evident that $$F_1(E_1,E_2) \text{ or } F_1(E^+,E^-)=E^+,\ F_2(E_1,E_2) \text{ or } F_2(E^+,E^-)=E^--E^+, \text{ and } f(T)=\epsilon^{-T/RC}$$

An expression for the voltage $e_G$ at point G in terms of operating potentials and the magnitudes of resistors $R_1$ and $R_2$ may be derived as follows:

$$e_G=\frac{R_2}{R_1+R_2}E^++\frac{R_1}{R_1+R_2}E^- \quad (4)$$

$$\frac{R_2}{R_1+R_2}=1-\frac{R_1}{R_1+R_2} \quad (5)$$

$$e_G=E^+\left(1-\frac{R_1}{R_1+R_2}\right)+E^-\frac{R_1}{R_1+R_2} \quad (6)$$

$$e_G=E^+-(E^+-E^-)\frac{R_1}{R_1+R_2} \quad (7)$$

From Equations 3 and 7 it necessarily follows that if $$f(T),\text{ or } \epsilon^{-T/RC}=\frac{R_1}{R_1+R_2} \quad (8)$$

then at time $t=T$, $e_H$ must be equal to $e_G$, irrespective of the particular values assumed by $E^-$ and $E^+$. Stated otherwise, as $E^+$ and $E^-$ vary, the voltage $e_G$ always equals the voltage $e_H(T)$ to which the timing capacitor will charge to in a period of T seconds. Since diode $D_4$ is biased forward when $e_H$ becomes equal to $e_G$, an output signal, in this case an abrupt voltage change, will always be available at the precise instant that $t=T$ even though $E^+$ and $E^-$ may have varied substantially from their designed values.

In the design of a circuit for marking a desired interval T we may select any values of R and C. However, it is preferable for the exponential function to have the steepest slope possible at time $t=T$. This relationship is desirable because the more rapidly the function is changing, or the steeper the slope, the more rapidly the threshold device may be triggered. An expression for the slope of the charging function may be obtained by differentiating the equation shown in Fig. 2B with respect to time. Then by maximizing the resulting expression with respect to RC, it can be shown that, independent of $E^+$ and $E^-$, the value of RC that will produce a wave form with the greatest slope at $t=T$ is $RC=T$. The values of R and C may sometimes be limited by practical considerations, however, and hence the designer must exercise judgment in their determination.

Figure 4:
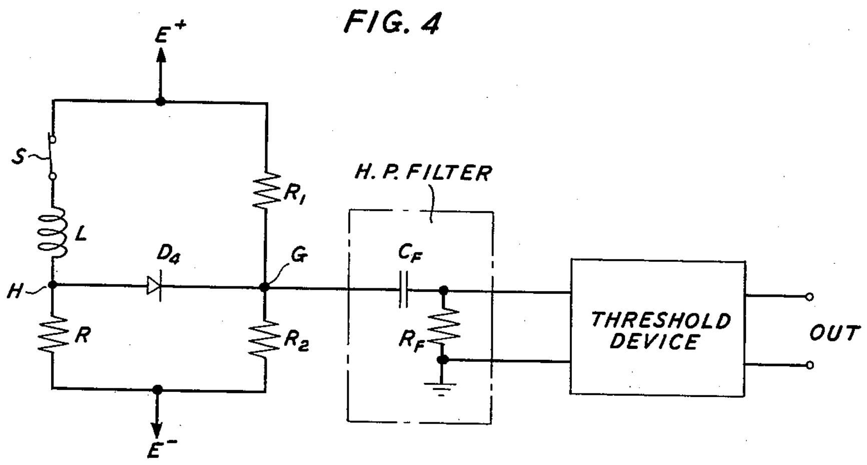
Fig. 4 is a schematic circuit diagram showing an RL circuit, in accordance with the invention, in combination with a balancing network and an output circuit.
Figure 5:
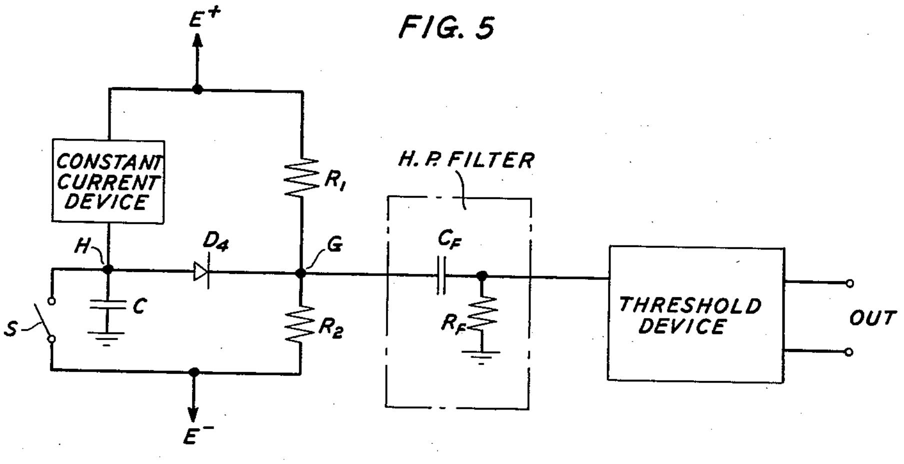
Fig. 5 is a schematic diagram of a circuit, in accordance with the invention, employing a timing capacitor and a constant current device together with a balancing network and an output circuit.

Fig. 4 shows substantially the same circuit as shown in Fig. 5 except that an RL timing combination is employed with a balancing network, in accordance with the invention, in contrast to the RC combination of Fig. 3. In the circuit of Fig. 4, if the switch S, theretofore open, is closed at time $t=0$, the characteristic opposition of an inductor to a change in current flow causes the voltage $e_H$ at point H to increase exponentially in the manner shown by the wave form of Fig. 2B. Moreover, the equation for this voltage change is well known to be $$e_H=E^+-(E^+-E^-)\epsilon^{-tR/L} \quad (9)$$

The voltage $e_G$ at point G may again be expressed by Equation 7 and accordingly, at any preassigned time T it again follows that $e_H$ will equal $e_G$ if $$f(T)=\frac{R_1}{R_1+R_2} \quad (10)$$

From Equation 9 it is known that $$f(T)=\epsilon^{-TR/L} \quad (11)$$

All of the conclusions drawn for the circuit of Fig. 3 with respect to the immunity of T to changes in $E^+$ and $E^-$ are therefore equally valid for the circuit of Fig. 4.

Fig. 5 shows a circuit arrangement, in accordance with the invention, which operates in a manner similar to that described for the circuits of Fig. 3 and Fig. 4. In Fig. 5, however, a constant current device, shown schematically, is employed so that the voltage wave form which develops at point H upon the opening of the switch S is linear rather than exponential. Various combinations may be employed to modify the exponential voltage wave form produced by a simple RC circuit so that the output is linear. For example, the well-known "bootstrap" circuit which finds use as a sweep circuit in television art provides substantially constant current through a resistor by means of a cathode follower arrangement. The current through the timing capacitor C is also constant and hence the sweep voltage developed is linear. A circuit of this type is shown by Millman and Taub in a standard text, Pulse and Digital Circuits, McGraw-Hill, 1956, page 229. In Fig. 5 the time function of the voltage change may be shown to be $$f(t)=\frac{kt}{C} \quad (12)$$

where $k$ is a constant determined by the kind and magnitude of the elements employed to produce linearity. Thus, at a specific time T, $$f(T)=\frac{kT}{C} \quad (13)$$

As in the circuits of Fig. 3 and Fig. 4, $e_H$ will be equal to $e_G$ at time $t=T$ if $$f(T)=\frac{R_1}{R_1+R_2} \quad (10)$$

Accordingly, the magnitudes of $R_1$ and $R_2$ are selected so that $$\frac{kT}{C}=\frac{R_1}{R_1+R_2} \quad (14)$$

It may be seen, therefore, that the principles of the invention are valid for any circuit which develops a timing wave form falling within the general expression $$e_H=F_1(E_1)-F_2(E_1-E_2)f(t) \quad (15)$$

The sole restriction on $f(t)$ is that it must obviously be a monotonically changing function, or at least monotonic in the area of interest on either side of any preselected time T.

Figure 6:
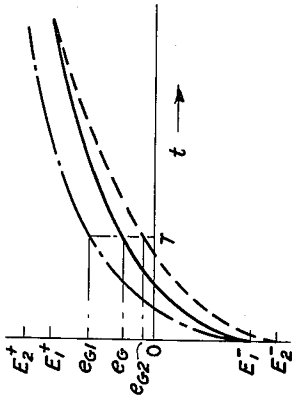
Fig. 6 is a plot of a family of capacitor charging wave forms resulting from supply potential variations.

Fig. 6 illustrates graphically that if $e_G$, in the circuit of Figs. 3, 4, or 5, is made to depend on the operating potentials in accordance with the principles of the invention, the time T at which a triggering voltage occurs will be independent of variations in $E^+$ and $E^-$. For example, if the supply voltages are $E^+_1$ and $E^-_1$, the triggering voltage is shown as $e_G$. If the positive voltage is changed to $E^+_2$, the triggering voltage shifts to $E_{G1}$ and similarly if the negative supply voltage changes to $E^-_2$, the triggering voltage occurs at $E_{G2}$.

Figure 7:
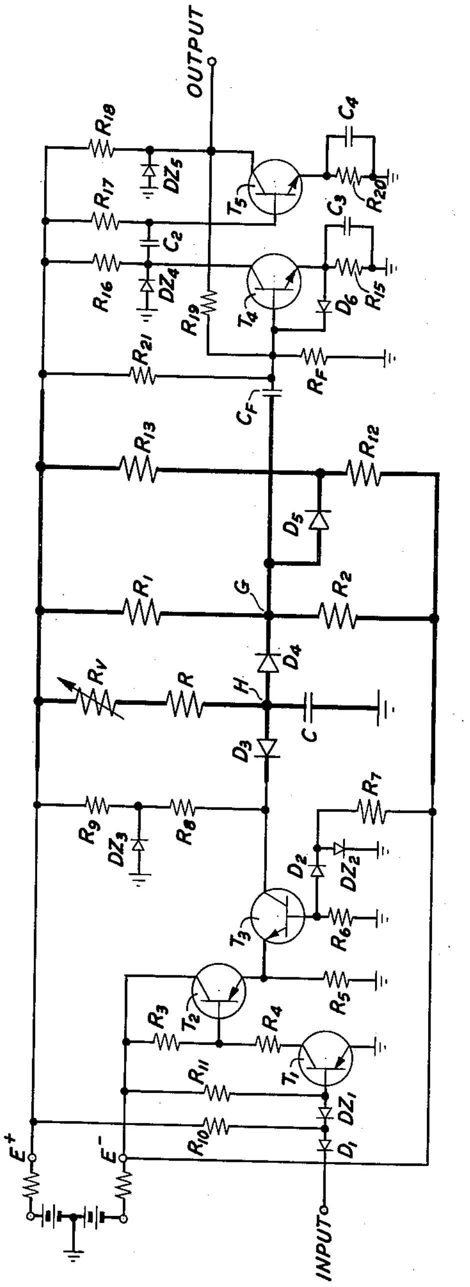
Fig. 7 is a schematic diagram of a timing network, in accordance with the invention, comprising an input stage, a timing stage, and an output stage.
Figure 8:
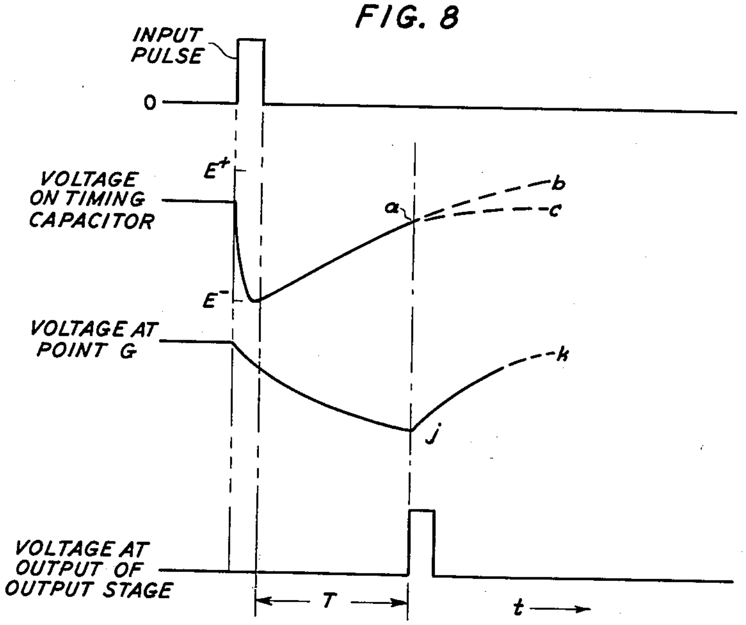
Fig. 8 is a plot of characteristic wave forms of the circuit shown in Fig. 7.

Fig. 7 shows an embodiment of the invention comprising a timing network which includes an input stage, a timing stage, and an output stage. The input stage is a three-transistor switch which initiates the timing cycle. For purposes of illustration, assume $E^+$ at +24 volts and $E^-$ at −24 volts. When an input pulse as shown in Fig. 8, and derived from a pulse source that is otherwise at ground potential, is applied to the input point of the input stage of Fig. 7, the timing capacitor C of the timing stage will be discharged to −24 volts. When the pulse disappears, diode $D_3$ becomes back biased and the timing operation begins as capacitor C charges toward +24 volts, as shown in Fig. 8.

Considering the circuit operation in more detail, before the receipt of a pulse, diode $D_1$ is forward biased through resistor $R_{10}$ by $E^+$, and the voltage on diode $DZ_1$ is below its breakdown value. Diode $DZ_1$, as well as the other diodes bearing a DZ designation, is of the breakdown type, i.e., one which exhibits a very high reverse resistance for reverse voltages less than a critical value and a very low incremental resistance for reverse voltages exceeding the critical value. In the circuit condition described, the junction between diode $D_1$ and diode $DZ_1$ is at a potential determined by the nature of the input pulse source; for example, it may be at ground potential. Also, at this stage, transistor $T_1$ is held in a fully conducting state by the voltage $E^-$, applied to the base by way of resistor $R_{11}$. Voltage at the base of transistor $T_2$ is fixed by resistors $R_3$ and $R_4$ to hold transistor $T_2$ in a partially conducting state. Diode $DZ_2$, which is biased, through $R_7$, to its breakdown condition by $E^-$, acts to apply a voltage to the base of transistor $T_3$ sufficiently negative to hold it in the Off or nonconducting condition.

When a positive pulse is received at the input point of the input stage, diode $D_1$ becomes biased in the reverse direction and the voltage at the junction between diodes $D_1$ and $DZ_1$ increases until the breakdown voltage of diode $DZ_1$ is exceeded. Current then flows through diode $DZ_1$ to turn transistor $T_1$ Off. With transistor $T_1$ in the Off state, the base of transistor $T_2$ goes to approximately $-24$ volts, thereby placing transistor $T_2$ in the fully saturated or On state. Neglecting the vary small emitter-collector drop of transistor $T_2$, which is in saturation, the emitter of transistor $T_3$ goes to $-24$ volts. Transistor $T_3$, of conductivity type opposite to that of $T_1$ and $T_2$, is thereby placed in the On state and its collector voltage is sufficiently negative to bias diode $D_3$ forward. With diode $D_3$ biased forward, capacitor C discharges through diode $D_3$ and the emitter-collector paths of transistors $T_3$ and $T_2$, and charges negatively to substantially the potential of $E^-$ or, $-24$ volts. This discharge route is a very low impedance path and allows the timing capacitor C to discharge rapidly.

As long as the input pulse is present, the situation described is maintained and capacitor C remains at substantially $-24$ volts or at $E^-$, as shown in Fig. 8. When the input pulse disappears, the junction of diodes $D_1$ and $DZ_1$ again goes to ground potential, transistor $T_1$ is turned fully On, the base of transistor $T_2$ and the emitter of transistor $T_2$ go to approximately $-4$ volts, and transistor $T_3$ is turned Off. Diode $D_3$ again becomes back biased, allowing the timing capacitor C to charge through timing resistor R and variable resistor $R_V$ toward $+24$ volts.

As the timing capacitor charges toward $E^+$, diodes $D_3$ and $D_4$ are biased in the reverse direction. As described hereinabove, the values of resistors $R_1$ and $R_2$ are selected so that diode $D_4$ will be biased forward in time T, irrespective of variations in $E^+$ and $E^-$. Diode $D_4$ and resistors $R_1$ and $R_2$ comprise the balancing network and resistors $R_1$ and $R_2$ may be conveniently referred to as balancing resistors. At time $t=T$, when diode $D_4$ becomes biased forward, the common point H is coupled through diode $D_4$ and capacitor $C_F$ to point G, thereby to pass the voltage $e_c(T)$ to the output stage. Capacitor $C_F$ passes this voltage but blocks the much slower variations of the power supply.

The output stage of the timing network shown in Fig. 7 is essentially a monostable multivibrator comprising transistors $T_4$ and $T_5$ and associated circuitry. Initially, transistor $T_4$ is biased to the edge of the active region. or almost fully Off, primarily by resistors $R_{21}$ and $R_F$. Transistor $T_5$ is held fully on by current flowing into its base through $R_{17}$. Voltage $e_c(T)$ marking the end of the timing interval is coupled through capacitor $C_F$ to the base of transistor $T_4$. Transistor $T_4$ starts toward saturation and the inverted and amplified signal is transmitted to the base of transistor $T_5$. Transistor $T_5$ then starts to turn Off and as its collector goes more positive, current through resistor $R_{19}$ completes the saturation of transistor $T_4$. The regenerative action switches $T_4$ fully On and $T_5$ fully Off very rapidly. After a time determined primarily by capacitor $C_2$ and resistor $R_{17}$, transistor $T_5$ starts to conduct by current received through resistor $R_{17}$. The regenerative action starts and $T_4$ is turned Off as transistor $T_5$ is turned On again. Consequently, the output circuit, when triggered by the output of the timing circuit, will emit a pulse signaling the completion of the timing interval.

Returning now to the Timing Stage, a more detailed consideration of the behavior of the voltage changes taking place at points H and G will serve to illustrate the operation of the voltage limiting network comprising diode $D_5$ and resistors $R_{12}$ and $R_{13}$. The purpose of this network is to keep the voltage at point G from rising too far above its equilibrium value.

At the inception of a timing cycle, the voltage at point H, or the voltage on the timing capacitor, will commence to rise from $E^-$ to a potential represented by point *a* in Fig. 8. Since the voltage at point *a* is reached at the termination of the timing interval, and in accordance with the invention the voltages at points H and G are then equal, diode $D_4$ becomes biased in the forward direction. In effect, capacitor C, instead of continuing to charge along the curve *ab*, commences charging toward a new potential which is approached along the curve *ac*. Additionally, the rate at which C was charging is also changed. The establishment of a new limiting potential for the charge of capacitor C and the introduction of a new time constant is, of course, the result of combining the balancing network with the timing circuit. The new charging resistance comprises the parallel combination of $R, R_V$ together with $R_1$. This parallel path also serves to lower the resistance between point G and $E^+$ with the result that the voltage at point G rises along the path shown as *jk* in Fig. 8.

Figure 9:
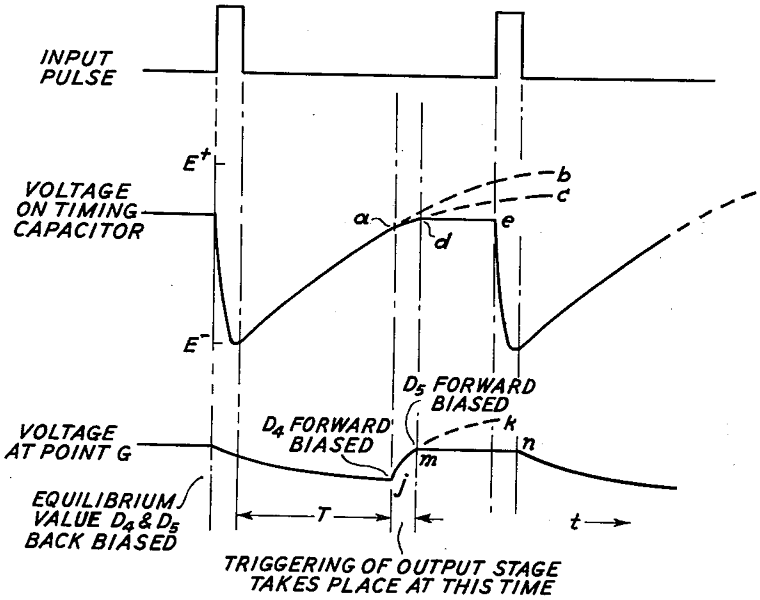
Fig. 9 is a plot of characteristic wave forms of the circuit shown in Fig. 7, illustrating in particular the function performed by the voltage limiting resistors.

Without the limiting network the voltage rise occurring at point G might continue to a point such that recovery to the equilibrium potential could not be effected between the inception and the termination of the next succeeding timing interval. With the limiting network, however, diode $D_5$ is biased in the forward direction after point G rises about one-half to one volt, which is the forward drop across diode $D_5$. This rise is shown as *j*—*m* in the "voltage at point G" curve of Fig. 9. The introduction of resistors $R_{12}$ and $R_{13}$ into the circuit at that point serves to shunt the timing capacitor charging resistance comprising R, $R_V$, and $R_1$, since the resistance values of $R_{12}$ and $R_{13}$ are substantially less than $R_1$. Again, a new potential level is established toward which the timing capacitor C charges so that the voltage wave form, instead of proceeding from point *d* toward point *c*, as shown in Fig. 9, levels off toward point *e*. Similarly, the voltage wave form of point G, instead of proceeding from point *m* toward point *k*, levels off toward point *n*. At that point the introduction of a new input pulse initiates another timing cycle. With reference to the point G voltage wave form of Fig. 8 and Fig. 9, it should be noted that the voltage scale has been expanded as compared to the scale used for the input pulse, output pulse, and timing capacitor wave forms.

When a positive input pulse is received, and diode $D_4$ is biased in the reverse direction, the voltage at point G will start to recover with a time constant determined by the $R_1$ and $R_2$ and by coupling capacitor $C_F$. If the values of $R_1$ and $R_2$ are made large so that the original charging wave is not appreciably altered when diode $D_4$ becomes biased forward, the value of capacitor $C_F$ may be limited by the permissible recovery time. However, the voltage limiting network restricts the potential at point G to a rise of approximately one-half volt or one volt above its equilibrium value and hence the recovery time constant is not a major consideration. In other words, even for a fairly large value of capacitor $C_F$ the voltage at point G will be approximately that determined by the supply voltages and the preselected values of the resistors of the balancing network.

With reference to the various embodiments of the invention shown by Figs. 3, 4, 5, and 6, certain obvious refinements, extensions, and variations of the principles of the invention will occur to persons skilled in the art. For example, one may assume that the operating potentials applied to the elements of the timing circuit in fact differ from the operating potentials applied across the elements of the balancing network and further, that the former potentials bear a known fixed relationship to the latter. Such a situation may be compensated for by extending the balancing network in accordance with well-known principles of circuit design.

Another variation, still within the scope of the invention, would include the use of a diode or asymmetrically conducting impedance device designed to conduct in response to a preselected potential difference, for example 10 volts, as compared to the use of diode $D_4$ in Fig. 7 which is biased forward when $e_H$ becomes equal to $e_G$. Such an arrangement may easily be devised by persons skilled in the art.

It will also be apparent to persons familiar with the art that the employment of the particular supply voltage relationships shown in Fig. 7 is not essential to the proper operation of the circuit. For example, insofar as the operations of the balancing network and the voltage limiting network are concerned, the operating potentials shown could be reversed in polarity or either could be at ground potential with the other at either a positive or a negative potential without affecting circuit operation, assuming of course that certain obvious design changes were made. For example, if the polarities as shown in Fig. 5 were reversed, diodes $D_3$ and $D_4$ would also be reversed.

It is to be understood that the above-described arrangements are illustrative of the application of the principles of this invention. Numerous other arrangements may be designed by those skilled in the art without departing from the spirit and scope of the invention.

What is claimed is:

1. A timing circuit comprising, in combination, a first source of nominally fixed potential $E_1$ and a second source of nominally fixed potential $E_2$, a first network comprising current-carrying elements of a first kind and of a second kind, respectively, interconnecting at a first common point, a second network, interconnecting said sources of potential, comprising at least one of the current carrying elements of said first network, means operative abruptly at the inception of a timing interval for determining an initial potential condition of said first common point, in dependence on at least one of said potentials $E_1$ and $E_2$, whereupon the potential of said first common point proceeds to change as time advances from said determined potential toward the other of said two potentials $E_1$ and $E_2$, following a course given by the relation $$V_p = F_1(E_1, E_2) + F_2(E_1, E_2) f(t)$$

in which the first and second functions depend only on said potentials $E_1$, $E_2$ while the third function depends on the magnitudes and kinds of said elements, the potential of said first common point thus reaching, in said course and after a time interval T, a preassigned magnitude given by the relation $$V_p = F_1(E_1, E_2) + F_2(E_1, E_2) f(T)$$

dependent on said elements and on said potentials $E_1$ and $E_2$, where $f(T)$ is the magnitude attained by $f(t)$ after said interval T, whereby the length of said interval T depends on said potentials $E_1$ and $E_2$, and means for balancing out the dependence of said interval T on said potentials $E_1$ and $E_2$ which comprises a third network comprising at least two current-carrying elements of a single kind interconnected at a second common point and interconnecting said sources of fixed potential, said two last-named elements being so proportioned that the ratio of the magnitude of one of them to the sum of the magnitudes of both of them is equal to $f(T)$, a utilization device and means responsive to the difference of potential between the first-named common point and the second-named common point, occurring at time $t=T$, for applying the changing potential of the first common point to said utilization device.

2. Apparatus in accordance with claim 1 wherein said first network comprises a resistor and a capacitor, said resistor being included in both of said first and second networks and said capacitor being connected between said first common point and a source of reference potential.

3. Apparatus in accordance with claim 1 wherein said first network comprises a resistor and an inductor, both of which are common to said first network and to said second network.

4. Apparatus in accordance with claim 1 including means in combination with said first network for producing a linear change in the potential of said first common point in response to the operation of said initial potential determining means.

5. Apparatus in accordance with claim 1 including means for limiting the potential change of said second common point after time $t=T$.

6. Apparatus in accordance with claim 1 wherein the elements of said second network are so proportioned that the potential of said first common point follows a course given by the relation $$V_p = F_1(E_1) - F_2(E_1 - E_2) f(t)$$

whereby the potential of said first common point reaches, after a preassigned time interval T, a magnitude given by the relation $$V_p = F_1(E_1) - F_2(E_1 - E_2) f(T)$$

7. A timing circuit comprising an input point, a first source of nominally fixed potential $E_1$, a second source of nominally fixed potential $E_2$, means for applying, at the inception of a timing interval, a changing potential to said point conforming to the relation $$V_P = F_1(E_1) - F_2(E_1 - E_2) f(t)$$

wherein $t$ is time, the potential of said point reaching, after a preassigned time interval T, a magnitude given by the relation $$V_P = F_1(E_1) - F_2(E_1 - E_2) f(T)$$

wherein $f(T)$ is the magnitude attained by $f(t)$ at time $t=T$, and means for balancing out the dependence of said interval T on $E_1$ and $E_2$, said balancing means comprising at least two resistors interconnected at a common point and interconnecting said sources, said two resistors being so proportioned that the ratio of the magnitude of one of them to the sum of their magnitudes is equal to $f(T)$, and means responsive to the difference of potential between said first-named point and said common point, occurring at time $t=T$, for generating an output signal marking the termination of said timing interval.

8. Apparatus in accordance with claim 7 including means for limiting the voltage change of said common point after time T, said limiting means comprising means connecting said source of common point to said potential $E_1$ through an asymmetrically conducting impedance device and a first limiting resistor in series relation and means connecting said common point to said potential $E_2$ through said impedance device and a second limiting resistor in series relation, the ratio between the magnitudes of said limiting resistors being substantially equal to the ratio between the magnitudes of said two resistors of said balancing means.

9. A timing network for establishing a timing interval between the receipt of an input signal and the generation of an output signal comprising an input point, means coupling said input point to a first nominally fixed potential source through a timing resistor, means coupling said input point to a source of reference potential through a timing capacitor, means coupling the junction of said timing resistor and said timing capacitor to said first potential source through an asymmetric impedance device and a first balancing resistor in series relation and to a second nominally fixed potential source through said asymmetric impedance device and a second balancing resistor in series relation, an output point, and means coupling the junction of said balancing resistors to said output point, the ratio of the value of said first balancing resistor to the sum of the values of said first and second balancing resistors being substantially equal to the natural logarithm base raised to the negative power represented by the ratio of said time interval to the product of the value of said timing resistor by the value of said timing capacitor.

10. A timing network in accordance with claim 9 including means for limiting said output point to a potential substantially below the potential of said first potential source .

11. A timing network in accordance with claim 10 wherein said potential limiting means comprises means connecting said output point to said first potential source through a second asymmetric impedance device and a first limiting resistor in series relation and to said second potential source through said second asymmetric impedance device and a second limiting resistor in series relation, the ratio between the values of said limiting resistors being substantially equal to the ratio between the values of said balancing resistors.

12. A timing network for generating an output pulse at a selected time interval after the receipt of an input pulse comprising means responsive to said input pulse for initiating the timing action of said timing network, means responsive to the output of said timing network for generating an output pulse, a timing capacitor and a timing resistor in series relation bridged between a source of reference potential and a first source of nominally fixed potential, means coupling the junction of said timing resistor and said timing capacitor to said first potential source through an asymmetric impedance device and a first balancing resistor in series relation, and to a second nominally fixed potential source through said asymmetric impedance device and a second balancing resistor in series relation, an output point, and means coupling the junction of said balancing resistors to said output point, the ratio of the value of said first balancing resistor to the sum of the values of said first and second balancing resistors being equal to the natural logarithm base raised to the negative power repreented by the ratio of said time interval to the product of the value of the timing resistor and the value of said timing capacitor.

13. A timing network in accordance with claim 12 wherein said initiating means comprises a multiple transistor switch providing a low impedance discharge path from said timing capacitor to said second potential source.

14. A network in accordance with claim 12 wherein said output pulse generating means comprises a monostable multivibrator.

15. A timing network for introducing a preselected time interval between the receipt of an input signal and the generation of an output signal comprising an input stage including a first transistor in common emitter configuration, a second transistor in common collector configuration, a third transistor in common base configuration, means connecting the collector of said first transistor to the base of said second transistor, a first source of nominally fixed potential coupled to the collector of said second transistor through a low impedance path, and a low impedance path coupling the emitter of said second transistor to the emitter of said third tratnsistor; a timing stage coupled to the collector of said third transistor of said input stage through a first asymmetric impedance device, said timing stage comprising means coupling said first asymmetric impedance device to a second source of nominally fixed potential through a timing resistor, means coupling said first asymmetric impedance device to a source of reference potential through a timing capacitor, means coupling the junction of said timing resistor and said timing capacitor to said second potential source through a second asymmetric impedance device and a first balancing resistor in series relation, and means coupling said junction to said first potential source through said second asymmetric impedance device and a second balancing resistor in series relation, the ratio of said first balancing resistor to the sum of said first and second balancing resistors being substantially equal to the natural logarithm base raised to the negative power of the ratio of said time delay to the product of said timing resistor and capacitor; means coupling the junction of said balancing resistors to said first potential source through a third asymmetric impedance device and a first limiting resistor in series relation and to said second potential source through said third asymmetric impedance device and a second limiting resistor in series relation, the ratio between the values of said limiting resistors being substantially equal to the ratio between the values of said balancing resistors; and an output stage coupled to said timing stage, said output stage comprising a two transistor monostable multivibrator.

16. In combination, a timing resistor, R, and a timing capacitor, C, in series relation, means connecting the free terminal of R to a first source of nominally fixed potential, means connecting the free terminal of C to a source of reference potential, a first and a second balancing resistor, $R_1$ and $R_2$, in series relation, means coupling the junction of C and R to the junction of $R_1$ and $R_2$ through an asymmetric impedance device, means connecting the free terminal of $R_1$ to said first potential source, means connecting the free terminal of $R_2$ to a second source of nominally fixed potential, and means for charging C toward said second potential source whereby said asymmetric impedance device conducts at a time interval T after the start of the charging action of C, the relative magnitudes of the elements of said combination being selected to conform to the relation $$\frac{R_1}{R_1+R_2}=\epsilon^{-T/RC}$$

whereby T is made independent of variations in said potential sources.

References Cited in the file of this patent

UNITED STATES PATENTS

| | | |
|---|---|---|
| 2,012,837 | Tear | Aug. 27, 1935 |
| 2,415,457 | Burns | Feb. 11, 1947 |
| 2,683,806 | Moody | July 13, 1954 |
| 2,817,772 | Lee | Dec. 24, 1957 |
| 2,824,287 | Green et al. | Feb. 18, 1958 |
| 2,845,548 | Silliman et al. | July 29, 1958 |

FOREIGN PATENTS

| | | |
|---|---|---|
| 508,449 | Great Britain | June 30, 1939 |